No. 831,809. PATENTED SEPT. 25, 1906.
C. L. W. TRINKS.
VALVE MECHANISM FOR ENGINES.
APPLICATION FILED MAY 28, 1906.
3 SHEETS—SHEET 1.
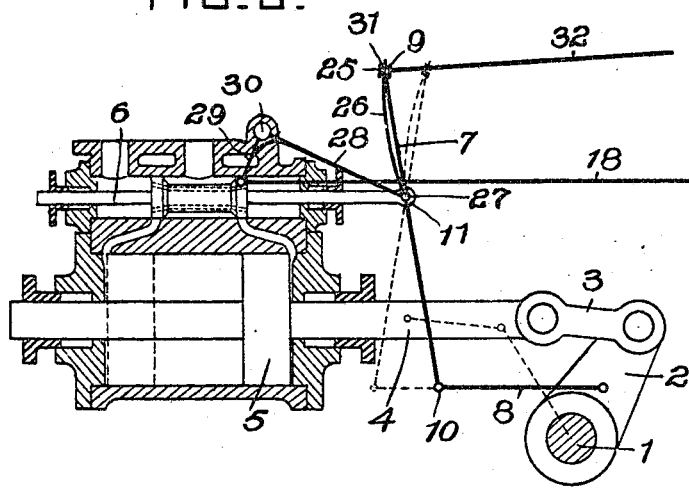
FIG. 5.
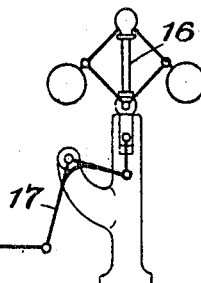
FIG. 1.
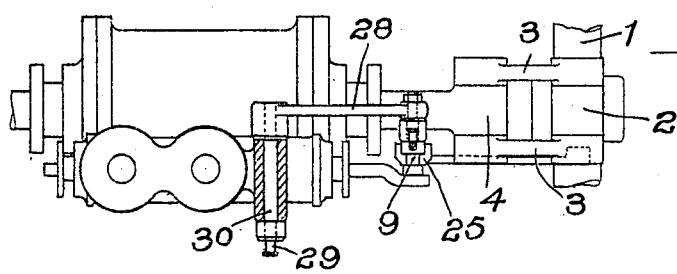
FIG. 6.
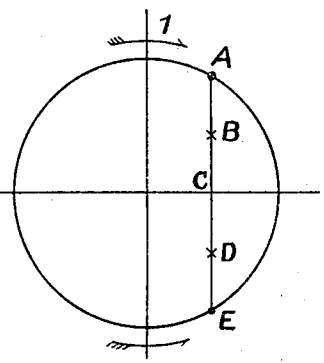
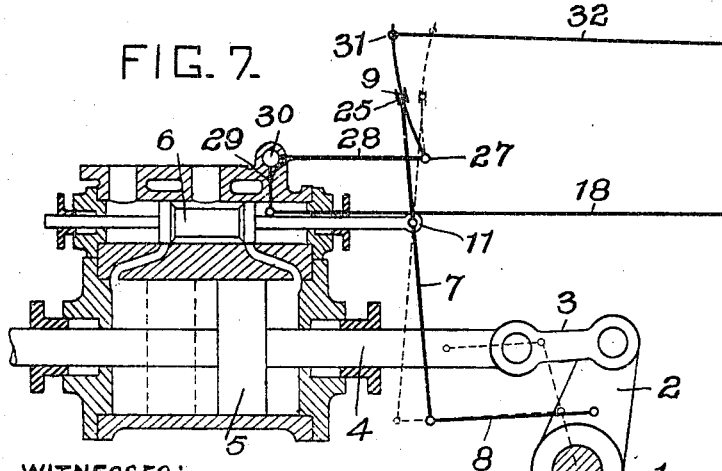
FIG. 7.
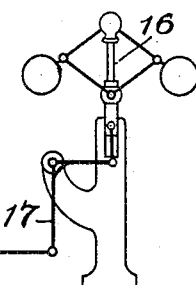
WITNESSES:
Wm. H. Gilson
J. Hobert Bradley
INVENTOR.
Charles L. W. Trinks
by Christy and Christy
Atty's No. 831,809. PATENTED SEPT. 25, 1906.
C. L. W. TRINKS.
VALVE MECHANISM FOR ENGINES.
APPLICATION FILED MAY 28, 1906.
3 SHEETS—SHEET 2.
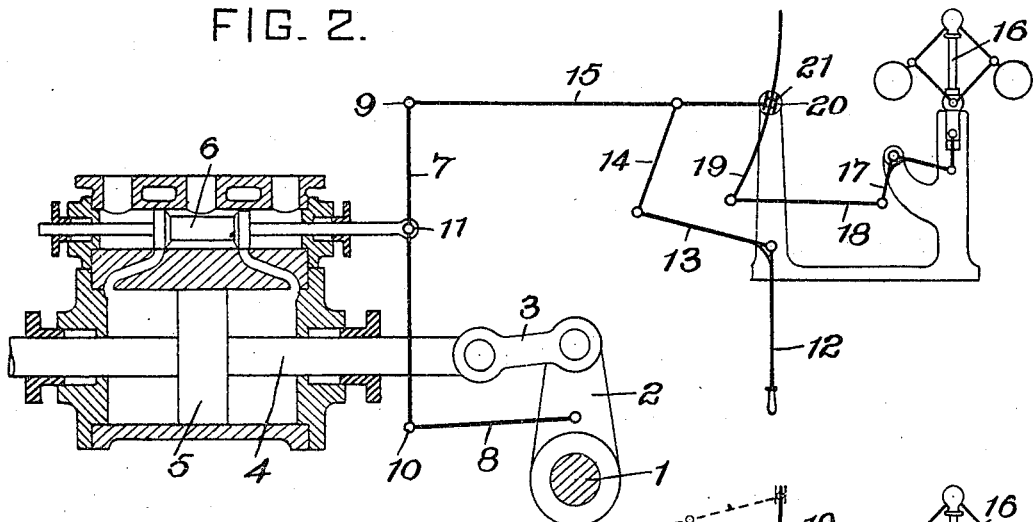
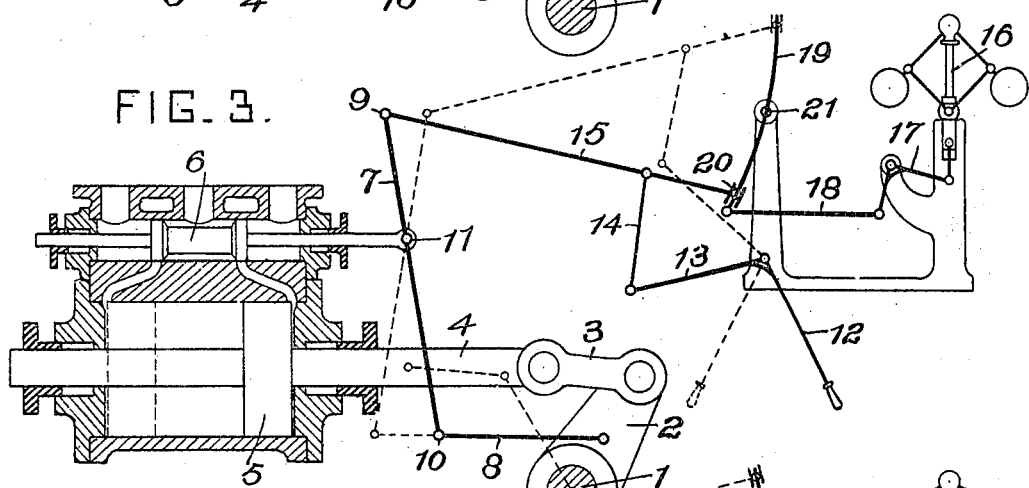
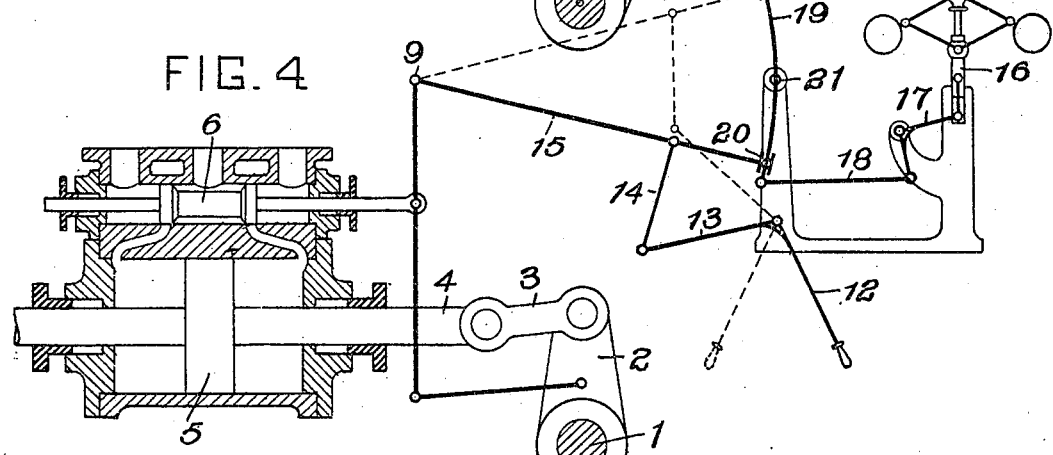
WITNESSES:
Wm. H. Wilson.
J. Herbert Bradley.
INVENTOR.
Charles L. W. Trinks
by Christy and Christy
Atty's.

No. 831,809. PATENTED SEPT. 25, 1906.
C. L. W. TRINKS.
VALVE MECHANISM FOR ENGINES.
APPLICATION FILED MAY 28, 1906.
3 SHEETS—SHEET 3.
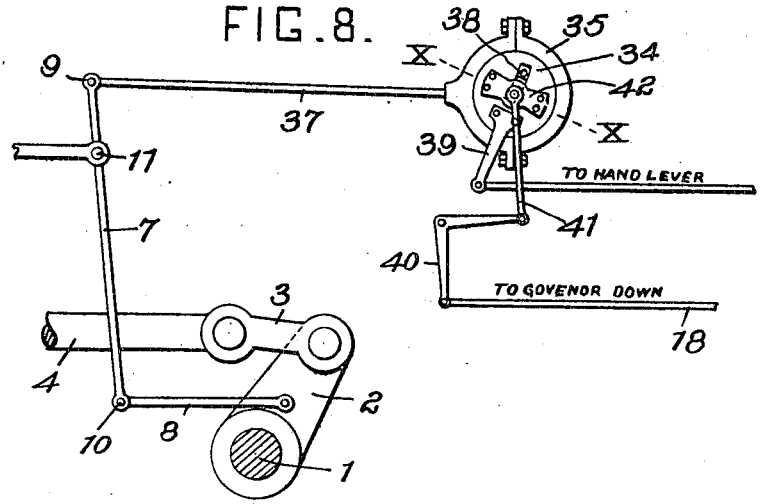
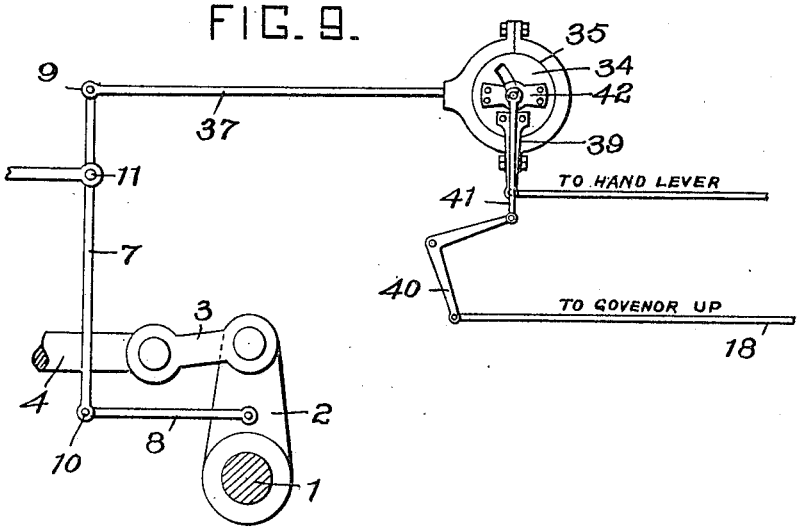
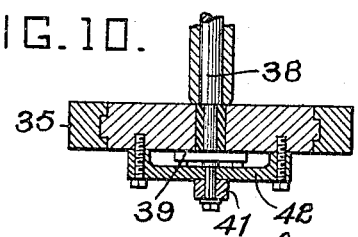
WITNESSES:
INVENTOR
Charles L. W. Trinks
by Christy and Christy
Atty's

UNITED STATES PATENT OFFICE.

CHARLES L. W. TRINKS, OF PITTSBURG, PENNSYLVANIA.

VALVE MECHANISM FOR ENGINES.

No. 831,809.　　　　Specification of Letters Patent.　　　　Patented Sept. 25, 1906.

Application filed May 28, 1906. Serial No. 319,127.

*To all whom it may concern:*

Be it known that I, CHARLES L. W. TRINKS, a subject of the German Emperor, residing at Pittsburg, in the county of Allegheny and State of Pennsylvania, have invented or discovered certain new and useful Improvements in Valve Mechanism for Engines, of which improvements the following is a specification.

The invention described herein relates to certain improvements in cut-off mechanism for reversing-engines, and has for its object a construction whereby the steam is gradually cut off with increasing speed independent of the direction of rotation of the engine and also without affecting the hand mechanism for operating the reversing of the gear regardless of the position of such hand-operated device.

In the accompanying drawings, forming a part of this specification, Figure 1 is a diagram representing the action of the eccentrics in a reversing-engine. Figs. 2, 3, and 4 are side elevations of portions of the reversing-engine, illustrating diagrammatically my improved valve-gear and governor in different positions. Figs. 5 and 7 are similar views illustrating another form or embodiment of the invention, and Fig. 6 is a plan view of the construction shown in Figs. 5 and 7. Figs. 8 and 9 are side elevations illustrating a modification of the link-and-block construction shown in the other figures, such modification involving the substitution of an adjustable eccentric and strap for the link and block. Fig. 10 is a sectional view on a plane indicated by the line X X, Fig. 8.

In rolling-mill engines whose speed is at all times controlled by the operator the control of the speed has heretofore been effected almost exclusively by the throttle. This form of control is wasteful as compared to the economy effected by the expansion and use of steam, as in automatic engines or engines of the Corliss type.

My invention relates to reversing-gears in which the resultant eccentric moves across the shaft with a small change of lead. In such reversing-gears a number of eccentrics or their equivalents are provided, and a link-motion is arranged in such a way that the engine-valve is moved in exactly the same manner as though it were driven directly from the eccentric whose center is located at A, Fig. 1, when the crank is on the dead-center and when the engine runs in the direction of arrow 1. For reversing, the link-motion is operated, and the center of the resultant eccentric is shifted from A over B, C, and D to E. While it is shifted from A to B the cut-off is shortened from three-quarters forward to about one-half forward. At C the cut-off is zero. At D it is one-half backward, and at E it is three-quarters backward. The fact that the cut-off is shortened near the central position of the link-motions is known to all skilled in the art and has been the basis of schemes to increase the economy at light loads by enabling the operator to have the link-motion under easy control at all times. The mechanical element which has been generally adopted for this purpose is the floating lever—that is, a lever with three connections, one to the hand of the operator, one to a valve controlling the motion of a fluid-pressure-operated piston which in turn operates the reversing mechanism, and a third connection to the fluid-pressure-actuated piston, said parts being so arranged that any motion of the piston and the reversing mechanism brings said controlling-valve back to closed or inoperative position. This floating lever makes the movement of the reversing mechanism directly proportional to the movement of the hand-operated element of the reversing mechanism just as though the point of the lever which is connected to the controlling-valve were a fixed fulcrum. The attempts to economize by placing the cut-off under the control of the operator have been more or less of a failure for the following reason: The resistance of the steel to the rolls is practically independent of the speed of rolling. The fly-wheel effect on the rotating parts in a reversing-engine is very small. These two facts combined produce the result that with a wide-open throttle the engine stalls if the cut-off is slightly too short and runs away if the cut-off is slightly too long in counterdistinction to an engine having a constant long cut-off and a given area of steam admission controlled by the throttle, wherein the differences of pressure control the rate of flow of the steam, and therefore operates similar to a governor. It is a fact known to all who have had experience with rolling-mill reversing-engines that operators use the throttle almost exclusively and do not use the variable cut-off on account of the great difficulties encountered in endeavoring to control the engine with the cut-off. This difficulty is overcome in my invention by interposing a mechanism between the cut-off or hand-lever for operating the reversing mechanism and the pilot-valve of the reversing mechanism, said interposed mechanism having the characteristic that the cut-off is shortened with increasing speed by the action of the governor regardless of the direction of rotation of the engine or the position of the hand-actuated element of the reversing mechanism.

Figs. 2, 3, and 4 illustrate one form of my invention in which the shaft 1 is employed to operate the reversing mechanism—as, for example, the links or the swinging lever. A lever 2 is rigidly fastened to this shaft, so as to rotate therewith, said lever being shown at Figs. 2 and 4 in mid-position corresponding to zero cut-off or to point C in Fig. 1. In Fig. 3 this lever or rocker-arm is shown in two positions. The solid lines show it in a position for maximum cut-off forward corresponding to point A in Fig. 1 and the dotted center line showing it in position for maximum cut-off forward corresponding to point E in Fig. 1. Rocker-arm or lever 2 is connected to the piston 5 of the fluid-pressure cylinder of the reversing mechanism by piston-rod 4 in Fig. 3. The movements of piston 5 and the controlling-valve 6 are interdependent through the medium of a suitable mechanism, as the floating lever 7, which is connected by link 8 to the lever or rocker-arm 2. For any position of lever 2 point 10 of lever 7 is a fixed point or fulcrum, so that the valve 6 is opened by any displacement of the hand-controlled point, as 9, of lever 7. The slightest movement of valve 6 admits steam on one side of the piston 5, moving it and closing valve 6 by means of connections from any suitable part of the reversing mechanism to lever 7, which moves on the point to which the hand-controlled mechanism is connected as a fulcrum. The motion which is caused by the action of the valve 6, the piston 5, and the floating lever 7 is just the same as though point 11 were a fixed fulcrum about which lever 7 swings, moving lever 2 by means of link 8, and as though the moving of the reversing-gear required little or no power. This action of the floating lever and the power-cylinder for operating the reversing-gear is so well known to all skilled in the art that it will not be followed step by step. Instead point 11 will be called the "ideal fulcrum" of lever 7, and it will be understood that lever 2 and the reversing-gear follow the motion of lever 7. The operator's hand takes hold of the reverse hand-lever 12. Its motion raises or lowers rod 15 by means of lever 13 and link 14. 16 is a centrifugal governor, which by means of bell-crank 17 and link 18 tilts curved link 19. This link is curved with length of rod 15 as a radius. Rod 15 is pivotally connected to link-block 20, and block 20 is slidable on curved link 19. Link 19 is pivotally connected at point 21 to any fixed part of the engine. The inclination of curved link 19 is so chosen that with governor down, (that is for slow speed of engine,) Figs. 2 and 3, a motion of hand-lever 12 through its entire range moves free end 9 of floating lever 7 through its entire range—namely, from solid-line position, Fig. 3, through position of Fig. 2, to dotted-line position of Fig. 3. Point 11 being the ideal fulcrum of lever 7, reversing-lever 2 is in this case thrown from extreme forward position to extreme backward position, and vice versa. With governor down the point 9 will have its maximum movement for a given movement of the reverse hand-lever. When the speed increases sufficiently to raise governor 16, curved link 19 is gradually pulled from the position of Fig. 2 or Fig. 3 into the position shown in Fig. 4. In Fig. 4—that is, greatest speed of engine and highest position of governor—link 19 is concentric with top 9 of lever 7 in its mid-position. Hand-lever 12 can therefore be swung throughout its entire range without in any way affecting the position of lever 7. Since floating lever 7 is held in mid-position, reversing-lever 2 stays in mid-position irrespective of the position of hand-lever 12. Therefore the engine is held at zero cut-off corresponding to point C of Fig. 1. It is evident that for an intermediate position of governor—for instance, half-way between the position of Fig. 3 and Fig. 4—the inclination of curved link 19 will also be half-way between the positions shown in Fig. 3 and Fig. 4, and that consequently the distance through which point 9 can be swung to either side from mid-position will only be one-half of the displacement shown in Fig. 3. The resultant eccentric, Fig. 1, can therefore only swing between points half-way between C A and C E—that is, it can be swung between the points B and D. This condition corresponds to a range of cut-off from about one-half cut-off forward through zero to about one-half cut-off backward. In Fig. 2 the reversing hand-lever 12 is shown in mid-position. In this position center of link-block 20 coincides with fulcrum 21 of curved link 19. The governor has no influence on the floating lever 7, because it tilts link 19 about the center of link-block 20 without moving rod 15. It is therefore evident that the influence of the governor is the smaller the nearer the reversing hand-lever is to mid-position.

The operation of the mechanism shown in Figs. 2, 3, and 4 may be briefly summed up as follows: For governor in lowest position a movement of hand-lever 12 between its extreme positions causes the reversing-lever 2 to travel from extreme position forward to extreme position backward, and vice versa. As the governor begins to rise the inclination of curved link 19 changes and point 9 is shifted toward its mid-position. Therefore any motion of lever 12 is transmitted to lever 7 only in a reduced degree. The reduction is the greater the higher the governor has risen and the floating lever is finally held in mid-position when the governor is in highest position. For a given rise of the governor the shifting of point 9 toward its mid-position is the smaller the nearer lever 12 stands to its mid-position. It is important and characteristic for my mechanism that the two motions—rise of governor 16 and swing of reversing-lever 12—do not interfere with each other. Either motion can take place without disturbing the other, and the position of the reversing-lever 2 and of the reversing-gear is simply a resultant of the positions of the two component moving elements 16 and 12. The application of this cut-off mechanism to a reversing-engine makes steam economy possible. The operator throws the reversing hand-lever back and forth between its extreme position in the usual way; but instead of regulating the speed entirely by the throttle he can now run with an almost open throttle, because the governor will automatically vary the cut-off, and thereby adapt the supply of steam to the consumption of power by the rolls.

In the drawings I have shown several arrangements which are merely types of mechanism embodying my invention. It is characteristic of my improvement that the distance of the element employed for shifting the pilot-valve from mid-position is proportional to the distance of the lever 12 or the hand-operated lever from mid-position and its range of movement from mid-position is reduced by change in condition of the governor from lowest to highest position. The terms "lowest" and "highest" as herein used refer to the position of the governor when speed of the engine is lowest and highest, respectively.

Without evading the spirit of my invention the same action can be obtained by an arrangement of parts different from that shown in Figs. 2, 3, and 4. For instance, a curved link may be provided which is tilted by hand and from which motion is transmitted to the floating lever by a link-block and a rod. The link-block is moved along the link by a governor in such a way that for governor all the way down the motion of the hand is transmitted unaltered to the floating lever and that for governor in highest position the center of the link-block coincides with the fulcrum of the link, locking the floating lever in mid-position. Such an arrangement would not be a different mechanism, but simply a kinematic transformation of the arrangement shown in Figs. 2, 3, and 4.

In Figs. 5, 6, and 7 I have shown another embodiment or construction of my improvement, and in these views the parts shown corresponding to those shown in Figs. 2, 3, and 4 are lettered to correspond therewith. To the top pin 9 of floating lever 7 is pivotally connected a link-block 25, which in turn is slidable on a curved link 26. Link 26 is pivotally connected to lever 28 in fulcrum 27. Lever 28 is rigidly connected to lever 29 through shaft 30. Lever 29 is controlled by governor 16 through bell-crank 17 and rod 18. Lever 28 and curved link 26 are so arranged that in lowest position of governor fulcrum 27 of link 26 coincides with ideal fulcrum 11 of floating lever 7. At the top 31 link 26 is pivotally connected to rod 32, which rod is controlled by the hand of the operator. With governor in lowest position, Fig. 5, fulcrum 27 and ideal fulcrum 11 coincide. Top 9 of floating lever 7 and top 31 of link 26 also coincide. Consequently any motion of the operator's hand is transmitted unaltered to floating lever 7 just as though rod 32 were fastened directly to pin 9. The location of center of shaft 30 and the lengths of levers 28 and 29 are so chosen that with governor in highest position fulcrum 27 coincides with top 9 of lever 7 for mid-position of this lever 7. (This condition is not shown in the illustrations.) That being the case, any motion of the operator's hand and of rod 32 will simply tilt link 26 about its fulcrum without changing the position of floating lever 7. The floating lever is therefore locked in mid-position for highest position of governor, and consequently lever 2, which controls the reversing gear, is held in mid-position, so that the resultant eccentric is shifted to and held at C, Fig. 1, cutting off steam almost entirely. Fig. 7 shows this same mechanism with the governor 16 midway between top and bottom position and for two positions of the hand-controlled link 26—namely, for extreme position forward (solid lines) and extreme position backward, (dotted lines.) The governor now holds lever 28 midway between bottom position, Fig. 5, and top position. (Not shown.) The weight of lever 28, link 26, and part of rod 32 has to be counterbalanced either by a weight or by a spring; but the counterbalancing being immaterial for the principle of my invention it has been omitted in the drawings. Since block 25 is pivotally connected to pin 9 and since link 26 has been raised half-way, block 25 is now midway between points 27 and 31. It is evident that in this position of the mechanism the influence of the motion of the hand-operated rod 32 on point 9 is reduced and that the greatest swing of point 9 in Fig. 7 is only one-half of the greatest swing of point 9 in Fig. 5. For a throw of the hand-operated rod 32 from extreme position forward to extreme position backward the floating lever 7 will in Fig. 7 only go from half-way forward to half-way backward. Since the reversing-gear which is coupled to shaft 1 follows the motion of the floating lever, the ideal eccentric can be swung between the limits of B and D only, Fig. 1, for a full throw of hand-lever between extreme forward position and extreme backward position. The curvature of link 26 and the location of the free end of rod 32 are preferably to be so chosen that points 9 and 9' are at the same distance from mid-position of floating lever in order to have the same cut-off backward and forward for a given position of governor—that is, speed of engine.

In the construction shown in Figs. 8, 9, and 10 I have shown an eccentric 34 and strap 35 in lieu of the link and sliding block pair. In this construction the strap is connected by a rod 37 to the pilot-valve preferably through the medium of the floating lever 7. The eccentric 34 is adjustably mounted on a shaft 38, which is secured to a stationary part of the engine. An arm 39 is secured to the eccentric and connected to the hand-operated reversing-lever, so that by the shifting of the eccentric by the hand-lever the eccentric is so changed in position as to reversely operate the valves of the engine. As shown, the eccentric can be shifted across the shaft to vary its eccentricity from maximum to zero and the reverse. This change in eccentricity is effected by the governor, which is connected by the rod 18 to one arm of a bell-crank lever 40, having its other arm connected by a rod 41 to a strap 42, secured to the eccentric. This construction closely resembles a link-and-block pair in which the link is adjustable relative to the block.

The mechanism herein described allows the governor to shorten the cut-off automatically with increasing speed no matter whether the engine runs forward or backward no matter where the hand-operated reversing-lever stands. It also allows the operator to throw the reversing-lever with perfect ease no matter where the governor stands and without reacting upon the governor. The governing mechanism is entirely automatic and does not tax the operator with any more work than he has to perform when controlling the engine entirely by the throttle.

The herein-described mechanism admits of many variations in detail design and in the arrangement of linkages without evading the spirit of my invention.

I claim herein as my invention—

1. A reversing-engine having in combination a reversing mechanism, a floating lever controlling such mechanism; means including two parts or elements movable relative one to the other for shifting the floating lever, a governor for shifting one of said parts, said means being so constructed that the action of the governor is proportional to the distance of the other part or element from mid-position.

2. In a reversing-engine the combination of a reversing mechanism, means for shifting the pilot-valve of the reversing mechanism, a governor and a connection of the governor to said valve, constructed to control the speed of the engine regardless of direction of rotation and operative independent of the other shifting means.

3. In a reversing-engine the combination of a reversing mechanism, a floating lever, a link-and-block pair for operating the lever, a connection from one of the elements of said pair to the governor, hand-operated means for shifting the other element of the pair, said parts being so constructed and combined as to control the speed of the engine regardless of the direction of rotation, and the elements of the link-and-block pair being movable without affecting the other member of the pair or its operating device.

4. In a reversing-engine the combination of a reversing means, a governor and connection from the governor to the reversing means, such connection including two parts or elements, one movable relative to the other and by the governor, said connection being so constructed that the action of the governor is proportional to the distance of the other part or element from mid-position.

5. In a reversing-engine the combination of a reversing mechanism, a floating lever, a link and sliding block pair for shifting said lever and a governor for operating one element of the pair, said parts being so constructed and combined that the action of the governor is proportional to the distance from the other part or element from mid-position.

6. In a reversing-engine the combination of a reversing mechanism, a floating lever controlling such mechanism, hand-operated means connected to the floating lever, a governor operative on the same point of the floating lever to shift the same, a means for combining the operation of the governor and hand-operated means whereby the action of the governor will shorten the cut-off with increasing speed, regardless of direction of rotation and without affecting the other operating means.

7. In a reversing-engine, the combination of a reversing means, a floating lever controlling such reversing means, a hand-operated means for shifting the floating lever and a cut-off mechanism also operative on the floating lever and constructed to gradually reduce the swing of the floating lever about its central position with increasing speed without affecting the operation of the hand-operated means.

8. In a reversing-engine the combination of a reversing mechanism, a floating lever controlling such reversing mechanism, a hand-operated means for shifting the floating lever, a cut-off mechanism constructed to regulate the action of the hand-operated means on the floating lever, whereby the action of such hand-operated means on the floating lever shall be proportional to the distance which the cut-off mechanism moves from the position occupied while the engine is operating at its highest speed.

9. In a reversing-engine the combination of a reversing mechanism, a hand-operated means, a floating lever, a cut-off mechanism including a link and block constructed to reduce the action of the governor of the cut-off mechanism on the floating lever from a given value to zero, and to increase such action while the hand-operated means is shifted from one extreme position to mid-position, and from the latter to the other extreme position respectively.

10. In a reversing-engine the combination of a reversing mechanism, a floating lever, a link and sliding block pair, having one part or member connected to the floating lever, a hand-operated means connected to one of the members of said pair and a governor connected to the other member, said parts being so constructed that a movement of the hand-operated means will not affect the position of the floating lever when the governor is in highest position and the floating lever in mid-position and the link will have such eccentricity when the governor is in its lowest position that the floating lever will be shifted through its entire range by the movement of the part operated by hand through its entire range relative to the other part.

In testimony whereof I have hereunto set my hand.

CHARLES L. W. TRINKS.

Witnesses:
 CHARLES BARNETT,
 FRIEDA E. WOLFF.